United States Patent [19]

Coupek et al.

[11] 4,139,684

[45] Feb. 13, 1979

[54] METHOD FOR PREPARATION OF HYDROPHILIC POLYMERIC ION EXCHANGING GELS

[75] Inventors: Jiří Čoupek; Otakar Mikeš; Petr Štrop; Miroslava Křiváková, all of Prague, Czechoslovakia

[73] Assignee: Ceskoslovenska akademie ved, Prague, Czechoslovakia

[21] Appl. No.: 545,019

[22] Filed: Jan. 29, 1975

[30] Foreign Application Priority Data

Feb. 1, 1974 [CS] Czechoslovakia .................. 703-74

[51] Int. Cl.$^2$ .................. B01D 15/04; B01D 15/08
[52] U.S. Cl. .................. 521/27; 521/38; 526/287; 526/303; 526/306; 526/307; 526/328.5; 526/329.2
[58] Field of Search ......... 260/80.75, 80.73, 79.3 MU, 260/2.1 R, 2.1 M, 29.6 TA, 79.3 M; 526/303, 320

[56] References Cited

U.S. PATENT DOCUMENTS

| | | | |
|---|---|---|---|
| 3,220,960 | 11/1965 | Michterb et al. | 260/29.6 H |
| 3,515,579 | 6/1970 | Shepherd et al. | 260/86.1 N |
| 3,622,532 | 11/1971 | Kolb et al. | 260/29.6 H |
| 3,669,103 | 6/1972 | Horper et al. | 128/156 |
| 3,767,600 | 10/1973 | Albright | 260/2.2 R |
| 3,784,540 | 1/1974 | Kliment | 260/80.73 |
| 3,957,741 | 5/1976 | Rembaum et al. | 526/312 |

OTHER PUBLICATIONS

"Ion Exchange"–Friedrich Helfferich, pp. 100–102, 1962,–McGraw–Hill Book Company, Inc. 1962.

*Primary Examiner*—Joseph L. Schofer
*Assistant Examiner*—Peter F. Kulkosky

[57] ABSTRACT

The invention relates to preparation of synthetic macroporous ion-exchanaging materials by a ternary copolymerization of hydrophilic monomers containing nonionogenous groups with monomers containing ionogenous groups and cross-linking monomers in an aqueous dispersion in the presence of inert components and suspension stabilizers. Hydroxyalkyl, oligoglycol and polyglycol esters and N-substituted or unsubstituted amides of acrylic and methacrylic acid are used as the hydrophilic monomers; compounds $CH_2=C(R)COX$, where $R = H$ or $CH_3$, $X = -OR_1N(R_2)R_3$, $-OR_1SO_3H$, $-NHR_1N(R_2)R_3$ or $-HNR_1SO_3H$, $R_1 =$ alkylene and $R_2$ and $R_3 =$ H, alkyl, hydroxyalkyl or aminoalkyl, acrylic and methacrylic acid serve as the ionogenous monomers; the crosslinking agents are selected from a group of monomers consisting of alkylene, oligoglycol or polyglycol diacrylates and dimethacrylates, alkylenebisacrylamides, alkylenebismethacrylamides, divinylbenzene and other compounds containing more than 2 polymerizable acryloyl or methacryloyl groups. The invented materials are suitable above all for isolation and chromatographic separation of sensitive compounds of the biological origin.

2 Claims, No Drawings

METHOD FOR PREPARATION OF HYDROPHILIC POLYMERIC ION EXCHANGING GELS

The invention relates to ion exchangers prepared by copolymerization of hydrophilic non-ionogenous monomers with ionogenous monomers resulting in formation of a hydrophilic ion-exchanging gel; suitable above all for isolation and chromatographic separation of sensitive compounds, usually of a biological origin, as are proteins, polypeptides, antigens, enzymes, nucleic acids and their high-molecular-weight fragments, as well as for numerous further possible applications.

Isolation is one from fundamental and very important chemical operations and materials with groups capable to exchange ions are very important tools used in this process. However, ion exchangers have numerous further applications which are not less important. Ion-exchanging materials manufactured till the present time did not satisfy always the requirements for their use, although already a great number of them was developed. The known materials are of the natural origin (various aluminosilicates, e.g. zeolites), or prepared by a simple modification of natural materials (e.g. sulfonated coal), or especially synthetic materials inorganic as well as organic. Only a limited number of inorganic synthetic ion exchangers is used; besides synthetic zeolites, also phosphates, molybdates and tungstates of thorium, titanium and namely of zirconium are important at the present time. A great number of organic synthetic ion exchangers has been prepared and is produced, starting with the oldest phenol — formaldehyde and urea resins to the up to date copolymers of acrylic acid and its derivatives with divinylbenzene and styrene — divinyl-benzene ion exchangers.

The above mentioned types of ion exchangers are mostly unsuitable for the purpose of isolation and chromatographic separation of sensitive compounds of the biological origin, which have a complicated sterical structure (primary, secondary and tertiary structure), as are proteins, polypeptides, nucleic acids and their fragments. Either they have unsuitable ionogenous properties (the inorganic ion exchangers) or strong hydrophobic interactions occur on the surface of hydrophobic aromatic matrices which destroy the higher structures of sensitive biological products and denaturate them (the organic ion exchangers). Therefore, application of these ion exchangers brings about an excessive loss of the valuable material or is impossible at all. In addition to it, the relatively high number of cross links allows to employ only the surface functional groups for the sorption of natural macromolecules. This is the reason why the hydrophilic ion exchangers were sought and prepared, which do not denaturate the natural polymers and are more accessible for macromolecules. Among these exchangers are namely ion-exchanging derivatives of cellulose (e.g. carboxymethylcellulose, diethylaminoethylcellulose, etc.) and ion-exchanging derivatives of polydextran (e.g. carboxymethyl, diethylaminoethyl, sulfoethyl or sulfopropyl, and quarternized aminoethyl derivatives of polydextran). An advantage of these ion exchangers is the polysaccharide structure of chains with numerous hydrophilic hydroxyl groups, with very sparce cross links (at polydextrans) or the fibrillous structure of cellulose; broad pores enable permeation of macromolecules to the functional groups of these ion exchangers. At the present time, these products are supplied by several producers for the purpose of sorption and chromatography of proteins, polypeptides, nucleic acids, their fragments and other compounds and are employed not only in the laboratory scale but also in plants.

A disadvantage of these products is their relatively low mechanical strength and the low chemical stability, because materials of the biological origin (cellulose, polydextran) which are neither mechanically nor chemically resistant are used for their preparation. Another disadvantage is the shape and properties of particles. Bunches of cellulose fibrils cannot be prepared in a globular form, even when the natural fibers are now shortened for the preparation of ion exchangers. The packing of a column acquires a form of the pressed felt at higher pressures and the column became clogged. Therefore, these materials are not perspective for the modern developing liquid chromatography where still higher through-flow rates and pressures are used and globular particles are required. This shape of particles is not very convenient also for the purpose of production plants.

Polydextrans are produced in a form of globules which are, however, very soft and considerably change their volume in dependence on the ionic strength of a solution. For this reason, they do not allow regeneration and washing with water in the columns. The column has to be packed again for each use and this fact makes the laboratory application and especially the plant application difficult. In addition to this, deformation of the soft spheroids and clogging of columns take place at increased through-flow rates and higher pressures. Neither this type of ion exchangers is therefore perspective for purposes of the modern liquid chromatography. Both types of ion-exchanging derivatives — cellulose and polydextran derivatives — are sensitive to the extreme values of pH, especially at the increased temperature, and to the oxidation and other chemical agents. Besides this, they are decomposed by some hydrolytic enzymes and are readily attacked by microorganisms.

An objective of this invention is the method for preparation of ion-exchanging materials by a ternary copolymerization of synthetically prepared hydrophilic monomers with ionogenous monomers and suitable crosslinking agents, in such a way that the resulting product has the hydrophilic character, the required ionogenous properties, the porosity controllable within broad limits, and a good chemical and mechanical stability. All these properties are achieved by carrying out the ternary copolymerization as it is further described.

The ternary suspension copolymerization is carried out in an aqueous dispersion medium in the presence of a suspension stabilizer selected from a series of compounds comprising polyvinylpyrrolidone, polyvinylalcohol, partially hydrolyzed poly(vinyl acetate), or some natural polymeric substances, as starch and pectins. The hydrophilic monomer containing the non-ionogenous functional hydroxyl or amide groups is selected from a group of compound comprising hydroxyalkyl acrylates, hydroxyalkyl methacrylates, oligo- or polyglycol acrylates, oligo- or polyglycol methacrylates, acrylamides, methacrylamides, N-substituted acrylamides and methacrylamides. The monomers containing the ionogenous functional group are acrylic acid, methacrylic acid, and monomers of the general formula

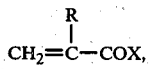

where R = H or CH$_3$ and

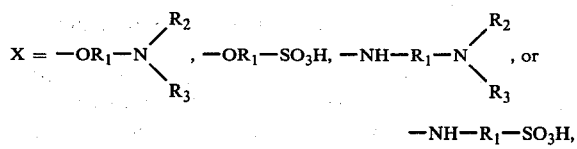

$-NH-R_1-SO_3H$, where
- R$_1$ is alkyl or alkylene and
- R$_2$ and R$_3$ are alkyls, hydroxyalkyls, aminoalkyls or radical H.

The crosslinking agents used are monomers with two or more acryloyl or methacryloyl functional groups, as lakylene diacrylates, alkylene dimethacrylates, oligoglycol and polyglycol dimethacrylates or diacrylates, alkylenebisacrylamides, alkylenebismethacrylamides, or divinylbenzene.

The resulting type of the fundamental macroporous or semi-macroporous aero-xerogel matrix provides the ion exchangers with the high mechanical stability, the pressure resistance and the chemical stability. The formed derivatives are resistant towards the acidic and alkaline hydrolysis, oxidation and effects of organic solvents. As the initial monomers are not compounds of the biological origin which may be suitable substrates for microorganisms, the prepared gels are also resistant towards contamination with germs or moulds. The copolymers swell only very little in aqueous solutions and their particles do not change the size with the changing ionic strength even at high capacities of the ion exchangers. Consequently, the ion exchangers are easy to regenerate. The easy control of the pore size within broad limits during the synthesis allows penetration of natural macromolecular polymers up to the molecular weight of millions preserving all advantages and enables in this way the preparation of materials with optimum fitting to the given purpose. Besides this, selectivity of the ion exchangers to molecules of various size may be achieved by choosing the suitable porosity.

These properties make the application of the new ion exchangers advantageous both in the laboratoty and production scale in common as well as in pressure columns and enable their use in the developing liquid chromatography and in sorption for production purposes by a column or a batch procedure. Because the new materials do not denaturate biopolymers, they are suitable for sorption and chromatographic separation of bipolymers without limiting their practical use to this. These ion exchangers may be prepared in the form of globular spheroids or also as blocks, granules, membranes, tubes, fibers, foils or belts. Threads or strings may be woven into a form of ion-exchanging fabric for the purpose of the continuous sorption and desorption on a conveyer belt.

Procedures for preparation of these ion exchangers are further elucidated in examples, without, however, limiting the scope of the invention to them.

EXAMPLE 1

A suspension copolymerization of 32.7 wt. parts of 2-hydroxyethyl methacrylate, 24.5 wt. parts of N,N-diethylaminoethyl methacrylate, and 24.5 parts of ethylene dimethacrylate was carried out in 88.8 parts of cyclohexanol, 19.5 parts of dodecylic alcohol and 600 parts of water in a glass autoclave of the volume 1 liter equipped with a stainless-steel anchorshaped stirrer with continuously controllable revolutions, a thermometer and a thermostating jacket for 12 hours at 80° C. The suspension was stabilized with 6 parts of polyvinylpyrrolidone (BASF, $\overline{M}w$ = 750,000). Azobisisobutyronitrile (0.8 parts) was used as the initiator of radical polymerization. After completion of the polymerization, the gel was thoroughly washed with water and ethanol, fractionated according to the particle size, and titrated to determine its exchange capacity in the usual way (0.29 mequiv/g). The ternary copolymerizations with varying initial concentration of N,N-diethylaminoethyl methacrylate was carried out in the similar way. FIG. 1 shows the dependence of the exchange capacity of ternary copolymers on the initial concentration of the ionogenous monomer. The exchange capacities of the product are plotted on the y-axis in miliequivalents per 1 g of the dry polymer, the concentration of N,N-diethylaminoethyl methacrylate is plotted on the x-axis in percent of the initial monomer mixture.

EXAMPLE 2

A strongly acidic cation exchanger was prepared in the similar way as in Example 1, with the distinction that 2-sulfoethyl methacrylate was used as the ionogenous monomer. The globular particles of the product were isolated and the exchange capacity was determined analogously as in Example 1 (1.39 mequiv/g).

EXAMPLE 3

The same apparatus was used as in Example 1 for copolymerization of 41.6 wt. parts of 2-hydroxyethyl, acrylate, 8.2 parts of N,N-diethylaminoethyl methacrylate and 32 parts of diethylene glycol dimethacrylate in the presence of 90 parts of cyclohexanol and 10 parts of lauryl alcohol. The exchange capacity of the product was determined after its isolation and washing.

EXAMPLE 4

A polymer having the macroporous structure was prepared analogously as in Example 1, with the distinction that N,N-dimethylaminoethyl methacrylate was used as the ionogenous monomer.

EXAMPLE 5

The same apparatus as in Example 1 was used for copolymerization of 33.5 wt. parts of diethylene glycol monomethacrylate, 32 parts of ethylene dimethacrylate and 16.5 parts of N-(2-sulfoethyl)methacrylamide in the presence of 100 parts of cyclohexanol. The macroporous polymer was obtained in the form of globular particles and was washed with water and ethanol and fractionated according to the particle size on screens. The fraction 100–200 μm was used for determination of the exchange capacity (0.73 mequiv/g).

EXAMPLE 6

A polymer was prepared analogously to the Example 1 with the distinction that methacrylic acid (14.9 parts) was used as the ionogenous monomer and the ternary copolymerization was carried out with 35 parts of 2-hydroxyethyl methacrylate and 32 parts of ethylene dimethacrylate in the presence of 98.5 parts of cyclohexanol and 10 parts of dodecylic alcohol. The resulting polymer was washed, fractionated and used as the weak acid cation exchanger.

EXAMPLE 7

Analogously to Example 1, 33 wt. parts of 2-hydroxyethyl acrylate, 32 wt. parts of methylenebisacrylamide and 18 parts of diethylaminoethyl acrylate were copolymerized in the presence of 100 parts of hexanol. The polymer was obtained in the form of globular particles and exhibited the exchange capacity 0.7 mequiv/g.

We claim:

1. An ion-exchange member having a hydrophilic character, macro or semi-macropores containing ionogenous groups and characterized by only slight swelling in aqueous solutions, said ion-exchange member being formed of a material produced by the ternary copolymerization in an aqueous dispersion medium in the presence of suspension stabilizer and inert component selected from the group consisting of hexanol, cyclohexanol, and mixtures of 88.8–98.5 wt. parts of cyclohexanol with 10–19.5 wt. parts of dodecylic alcohol, of (a) hydrophilic monomers containing non-ionogenous groups, said hydrophilic monomers containing functional hydroxyl or amide groups selected from the group of compounds consisting of hydroxyalkyl acrylates, hydroxyalkyl methacrylates, polyglycol acrylates, polyglycol methacrylates, acrylamides, methacrylamides, and N-substituted acrylamides and methacrylamides (b) monomers containing ionogenous groups and selected from the group consisting of acrylic acid, methacrylic acid and monomers represented by the formula

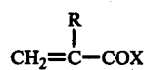

wherein:
$R$ = H or $CH_3$, and
x is

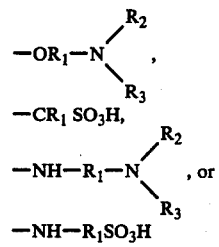

$R_1$ is alkylene
$R_2$ and $R_3$ are hydrogen, alkyl, hydroxyalkyl or aminoalkyl radicals; and (c) 30.0 to 39.1% by weight of crosslinking agents selected from the group consisting of alkylene diacrylates, alkylene dimethacrylates, oligoglycol and polyglycol diacrylates, oligoglycol and polyglycol dimethacrylates, alkylenebisacrylamides, alkylenebismethacrylates and divinylbenzene.

2. The ion-exchange member of claim 1, wherein the monomer containing ionogenous groups is diethylaminoethyl methacrylate.

* * * * *